United States Patent [19]

Hulse

[11] 4,273,347
[45] Jun. 16, 1981

[54] INTERLOCK SYSTEM FOR A TRAILER AND BOGIE

[75] Inventor: David O. Hulse, Lionville, Pa.
[73] Assignee: The Budd Company, Troy, Mich.
[21] Appl. No.: 77,897
[22] Filed: Sep. 24, 1979
[51] Int. Cl.³ .............................................. B62D 27/04
[52] U.S. Cl. .................................................. 280/80 B
[58] Field of Search ....................................... 280/80 B

[56] References Cited
U.S. PATENT DOCUMENTS
3,177,002  4/1965  Schmidt ............................ 280/80 B Primary Examiner—John J. Love
Assistant Examiner—John A. Carroll
Attorney, Agent, or Firm—A. L. Trueax, Jr.

[57] ABSTRACT

A "bogie" is disposed to be slid within a pair of tracks on a trailer. A movable pin element is adapted to pass through openings in at least one of the rails and tracks to secure the bogie to the trailer. The pin element includes means for providing a chamber to permit air pressure to release the parking brakes for the wheels of the bogie only when the pin is in a position securing the bogie to the trailer. If the pin is not in position, the parking brakes in the bogie cannot be released.

9 Claims, 5 Drawing Figures

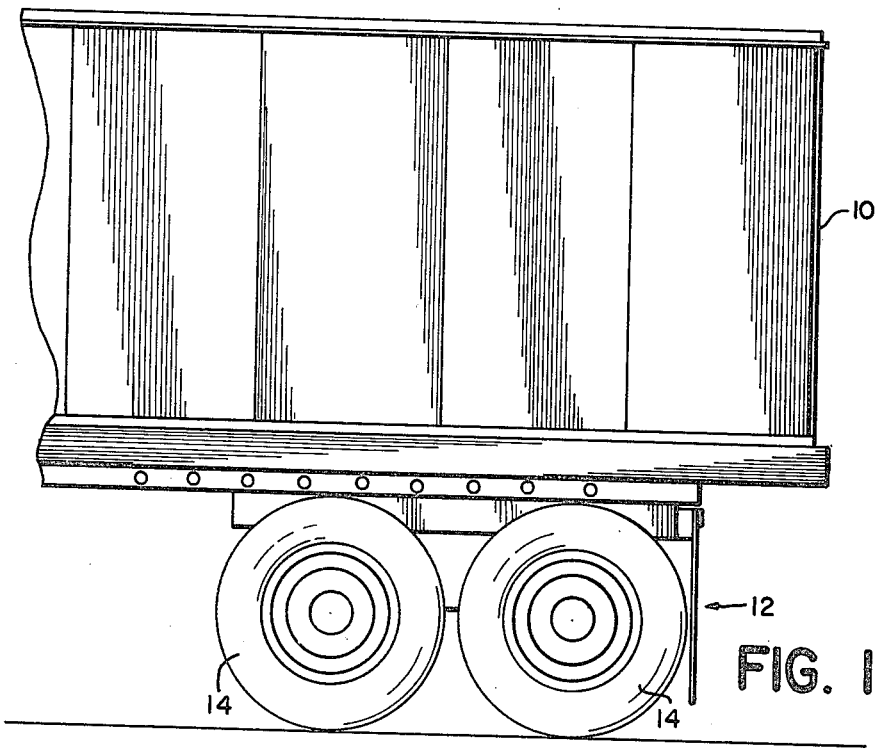
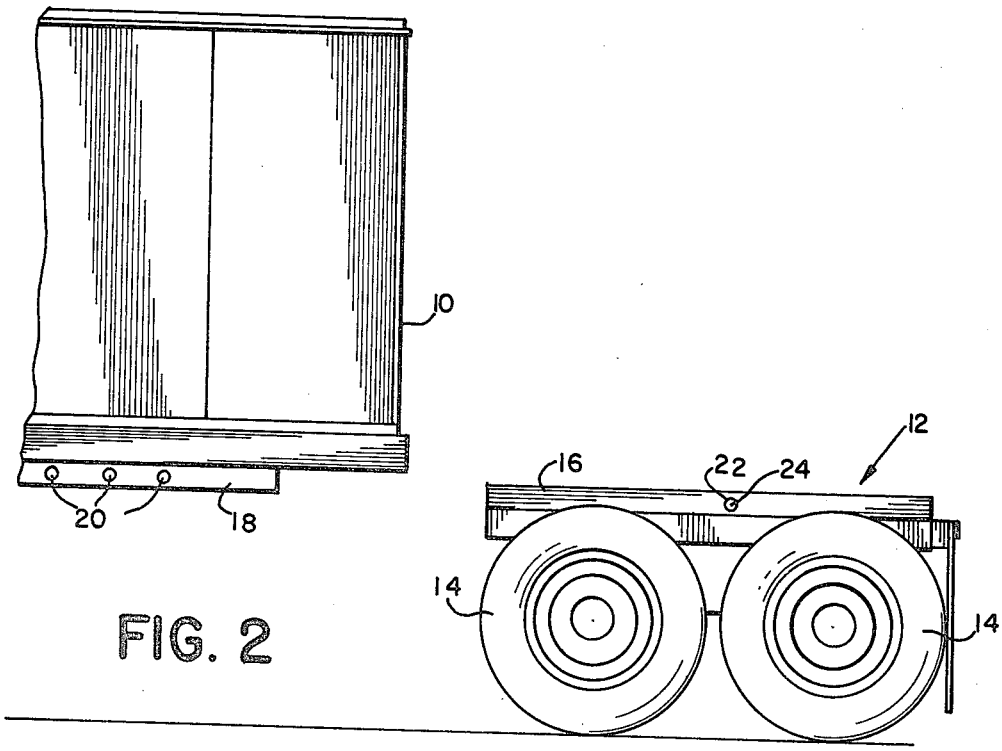

INTERLOCK SYSTEM FOR A TRAILER AND BOGIE

Many conventional trailer systems involve a wheeled structure, commonly called a "bogie" for supporting the trailer and providing brakes. The bogie is often moved with respect to the trailer for different positions of loads on the axle or for shortening the turning radius. The trailer generally includes a pair of tracks disposed to receive a pair of slidable rails integral with or mounted to the bogie.

The bogie is generally placed under the trailer with the tracks of the trailer guiding the rails of the bogie as the operator of the bogie moves the trailer to the desired position over the bogie. When the bogie and trailer are properly positioned, a series of heavy pins, either two or four, are used to secure the bogie in a fore and aft direction, under the trailer box. The pins are passed through openings in the rails of the bogie and through selected ones of a plurality of spaced openings in the tracks of the trailer.

On sliding bogie trailers of the type described, it is possible to operate the vehicle, including the tractor and trailer, without the rear bogie, which includes the wheels, brakes, subframe, suspension and other items being attached to the trailer by a positive locking mechanism. This happens when the pin elements are not properly inserted through the openings in the rail and track of the trailer and bogie structure.

Because it is possible to operate the trailer fully loaded or empty, on a public highway without the pins being engaged through the holes in the rails and tracks to secure the bogie to the trailer, when the brakes of the bogie are normally applied the bogie will stop but the trailer or box will continue to move forward and slide off the top of the bogie. As the box leaves the bogie, it may tip the bogie and start it bouncing erratically down a highway. In addition to the loose bogie creating a dangerous situation likely to cause injury or property damage the rear end of the trailer will drop on the road and cause serious damage and lack of vehicle control because the bogie, which includes the brakes, has separated from the trailer.

It is an object of this invention to provide means for minimizing the likelihood of a wheeled structure (bogie), from becoming detached from a trailer when the trailer is being pulled by a tractor.

It is a further object of this invention to provide an improved locking mechanism to prevent a trailer from shifting positions on a wheeled structure when the trailer is being operated and pulled by a tractor.

It is still a further object of this invention to provide a novel safety mechanism in which a bogie cannot be operated by a tractor until the bogie is secured in place to the trailer.

In accordance with the present invention, a bogie having wheels normally braked by independent mechanical means (when detached from a trailer) includes a pair of rails for slidably engaging and positioning within a pair of tracks on the trailer. One or more pin elements is disposed to pass through openings in at least one of the rails and tracks to secure the bogie to the trailer. The pin element includes means for connecting a source of air pressure to the brake chambers in the bogie to overcome the braking provided by the independent mechanical means when the pin element is properly inserted through the rail and track. If the pin element is not properly inserted, the mechanical braking continues to be applied and the bogie cannot be rolled.

Other objects and advantages of the present invention will be apparent and suggest themselves to those skilled in the art from a reading of the following specification and claims, taken in conjunction with the accompanying drawing, in which FIG. 1 is a side view, partly broken away of a trailer positioned over a bogie, of the type related to the present invention;

FIG. 2 is a side view of the trailer removed from the bogie illustrated in FIG. 1;

Figure 3:
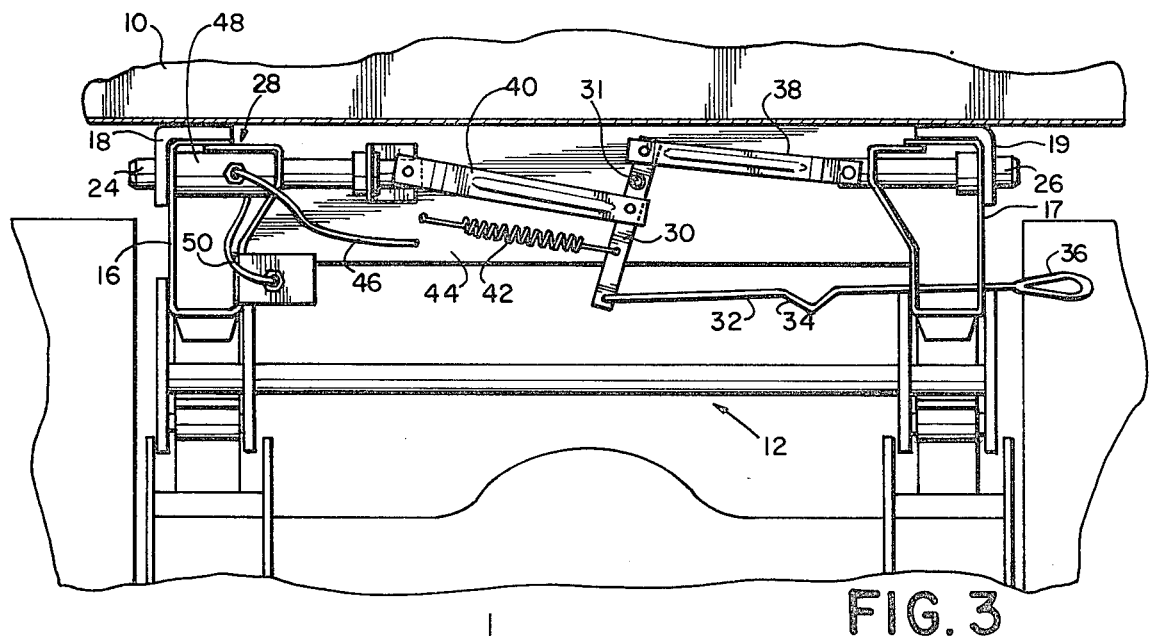
FIG. 3 is an end view, partly broken away, of the mechanism for locking the bogie to the trailer, in accordance with the present invention.

Referring particularly to FIGS. 1 and 2, a typical bogie and trailer arrangement found in conventional systems, as well as in the present invention, is illustrated. The trailer or box 10 is disposed to rest on a bogie 12. The bogie 12 is slidably mounted to the trailer 10 and may be moved to different positions depending upon the particular loading of the trailer. As discussed above, the driver of the tractor moving the trailer 10 generally will move the trailer box 10 over the bogie 12 until the desired position is reached at which point the bogie is locked to the trailer 10. The bogie 12 may include the conventional apparatus which involves brakes for wheels 14, suspension system, subframe and other apparatus.

The wheels 14 of the bogie 12 are generally locked in a parking position by an independent or separate mechanical spring braking system. When it is desired to move the trailer 10 in conventional systems, air pressure, from a source such as a tank in the tractor system, is applied to air chambers associated with the wheels 14 to overcome the braking provided by the independent mechanical spring means. The bogie generally cannot be moved until the air pressure to the emergency tank is applied to overcome the braking pressure provided by the mechanical springs.

FIG. 2 illustrates a situation in which the trailer 10 is separated from the bogie 12. As will be described in detail, if the bogie 12 is not securely attached to the trailer 10 by a locking means of the type to be described, the bogie 12 may be accidently detached from the trailer 10 and cause serious problems especially when the trailer is being moved at relatively high speeds.

In general, the bogie 12 comprises a pair of parallel rails 16 adapted to slide and ride within a pair of parallel tracks 18 which are secured to the trailer 10. The vertical edges of the tracks 18 include a series of equally distanced holes 20 on each side which are adapted to receive connecting pins, as will be described. The rails 16 of the bogie 12 also include an aperture or opening 22 which receives a connecting pin 24 therethrough. The openings 20 in the tracks 18 on the trailer 10 may be spaced at any desired intervals such as every three, four or six inches. In general, the sliding range from the foremost position of the bogie 12 to the rearmost position is about eight feet.

In operation, after the bogie 12 is positioned under the trailer 10, the driver will use the tractor to reposition the trailer 10 to a different position with the pin elements removed from the openings in the tracks. When the desired position is reached, one or more pins are then being inserted through the openings 22 of the rail 16 in the bogie 12 and through selected ones of the openings in the track 18 of the trailer 10.

Referring particularly to FIG. 3, the rails 16 and 17 of the bogie are illustrated as being in place within the tracks 18 and 19 of the trailer. In this position, a pair of pin elements 24 and 26 extend through the openings in the rails and selected ones of the openings 20 in the track 18. In the position illustrated, the bogie has been relocated to the desired position and the pins 24 and 26 are then locked into position to secure the bogie to the trailer.

A mechanical locking system 28 comprises a lever arm arrangement including a central arm 30 pivotally at pivot connection 31 connected to a cross frame 44 of the bogie structure having one end connected to a pull rod 32. The pull rod 32 includes a notch 34 and a handle 36. The notch 34 is used to secure the rod 32 to the rail 17 when the handle 36 is extended. The opposite end of the central arm 30 includes a lever arm 38 which is connected to the pin 26 to move it in or out of the openings in one of the rails and tracks, with the position being dependent upon the position of the pull rod 32.

A lever arm 40 is also connected between the arm 30 on the opposite side of the pivot connection 31 than the arm 38 to move the pin element 24 in or out of the openings in the track and rail of the trailer and bogie respectively. A spring 42 is connected to normally bias the arm 30 and is connected between the arm 30 and a crossbeam 44 of the bogie. When the bogie is under the trailer with the pins in place, the pins 24 and 26 are held under tension by the spring 42. This is because the arm 30 forces the arms 38 and 40 to the right and left, respectively. The arm 32 is released in the position illustrated in FIG. 3 during a lock-up condition. The rails of the bogie will slide in the tracks of the trailer until the pins 24 and 26 line up with particular selected openings in the tracks 18 and 19. At this point, with the arm 36 released, the spring 42 will force the pin elements 24 and 26 outwardly to lock the bogie to the trailer.

When it is desired to unlock the bogie from the trailer, the handle 36 is manually pulled to overcome the spring bias of the spring 42 and to move the lever arm 30, which in turn moves the lever arms 38 and 40 to remove the pin elements 24 and 26 from the opening in the tracks of the trailer thereby permitting free slidable movement of the bogie with respect to the trailer box. A notch 34 in the rod 32 is secured to the outside edge of the rail 16 when it is desired to hold the pins 24 and 26 free of the holes in the tracks of the trailer. Thus far the system described is conventional and found in many trailer systems.

One of the problems encountered in some of the prior art trailer systems is that the pin elements, such as the pin elements 24 and 26, are not properly inserted through the openings in the tracks of the trailer. When moving at relatively low speeds or under heavy loads, the bogie may well move along with the trailer despite the unlocked condition. However, under high speed conditions, if the bogie is suddenly braked, the trailer will tend to continue to move forward over the bogie and cause the bogie to be detached from the trailer to cause injury and other damage. The present invention is concerned with assuring that the mechanical brakes of the bogie cannot be overcome unless the pins 24 and 26 are properly inserted to provide a locking condition between the bogie and the trailer.

As previously mentioned, many trailer systems must utilize air pressure from an emergency tank to overcome the parking mechanical braking pressure that is normally applied to the wheels of the bogie. Basically, the present invention involves associating elements with the pins 24 and 26 in the path of air flow ahead of the emergency tank and the brake chambers of the wheels of the bogie. When the pins are properly inserted, the air pressure to and through the emergency tank is applied to the chambers to overcome the mechanical braking of the wheels of the bogie. On the other hand, if the pin elements are not properly inserted, the path of the air pressure to the emergency tank and thus to the brake chambers will be broken and the mechanical brakes will not be released and the bogie wheels will not roll. The present invention in effect relates a safety feature to assure that the bogie is securely locked to the trailer before it can be operated over the road.

The air pressure from the tractor system source (not illustrated) to overcome the mechanical braking means is applied through a conduit 46 to a housing or guide means 48. As will be described, the guide means 48 provides a portion of a chamber which receives air from the conduit 46 and transmits it to an outlet conduit 50 which is connected through a suitable valve and emergency tank to the air chambers of the brake to overcome the mechanical parking brake pressure on the wheels of the bogie, as will be described in connection with FIGS. 4 and 5.

Figure 4:
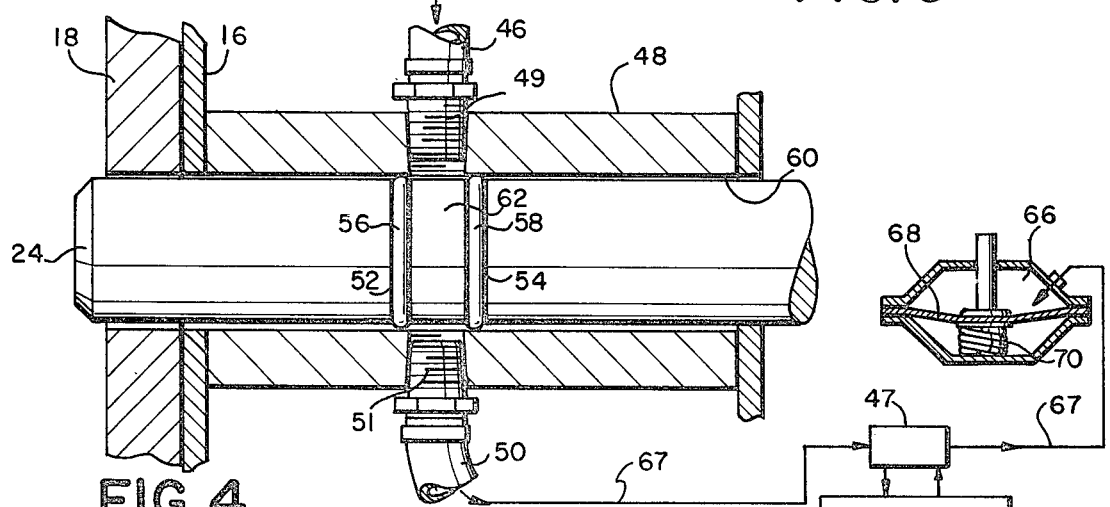
FIG. 4 is an enlarged view of a portion of the mechanical arrangement in which the bogie is locked in place to the trailer.

Referring to FIG. 4, positions of the pins 24 and 26 are illustrated in which the pins are secured in place through openings in the rail 16 and track 18. The pin 24 also extends through a central opening 60 within the housing 48. The pin 24 includes a pair of spaced recesses or grooves 52 and 54 which are adapted to receive flexible sealing rings or "O" rings 56 and 58 therein. The sealing rings 56 and 58 are flexible and dimensioned to sealingly engage the interior wall provided by the opening 60 within the housing 48. The sealing rings 56 and 58 in conjunction with the housing 48 provide an air tight pressure chamber 62. When the pin 24 is moved within the housing 48, the position of the chamber 62 formed by the rings 56 and 58 is also moved.

The conduits 46 and 50 are connected to the housing 48 and extend through threaded openings 49 and 51 which receive the conduits and lead into the central opening 60 of the guide means. The ends of the conduits leading to the chamber 62 are aligned with respect to each other in the same vertical plane parallel as the rings 56 and 58. When the chamber 62 is aligned with the conduits 46 and 50, the conduit 50 connects air pressure from a source in the tractor through the chamber 62 to the conduit 46. Pressure from conduit 46 is applied to a valve 47 which is connected to the emergency tank 64. When the pressure at the valve 47 reaches a predetermined level, pressure from the emergency tank 64 is transmitted to the braking chamber 66. When pressure is applied to the chamber 66, a diaphragm 68 is moved to overcome the pressure of the mechanical spring 70. When the mechanical spring pressure is overcome, the braking pressure is removed from the wheels of the bogie which permits it to roll.

Figure 5:
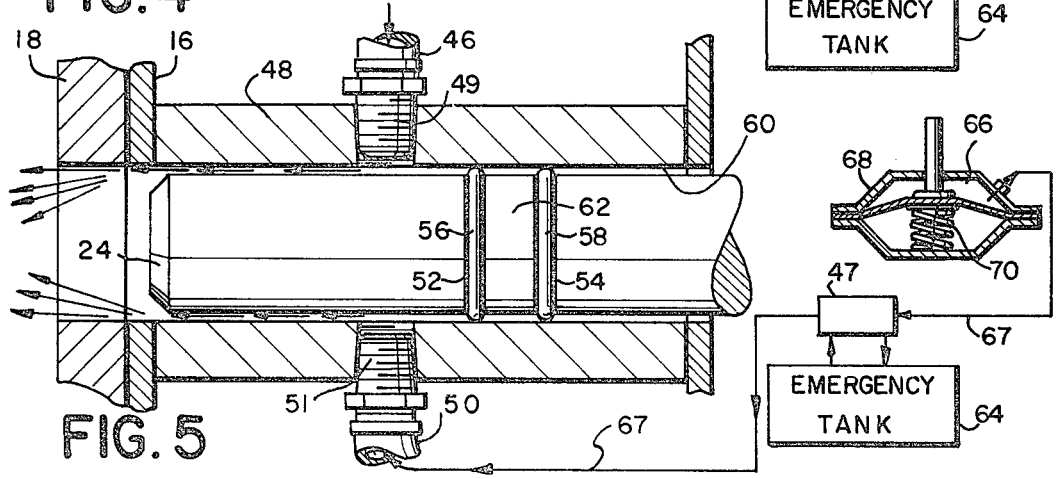
FIG. 5 is a view somewhat similar to FIG. 4 in which the bogie is not locked in place to the trailer.

Referring to FIG. 5, consider now a situation in which the pin 24 is not properly inserted through the openings of the rail and track thereby creating an unsafe condition. Under these conditions, the chamber 62 provided by the sealing rings 56 and 58 will be out of alignment with the conduits 46 and 50. This means that the pressure from the conduit 46 cannot pass to the conduit 50 and no pressure will be available to release the mechanical brakes. Furthermore, pressure in line 67 between the chamber 66 and valve 47 connected to the emergency tank 64 will be released. As indicated by the arrows, the air pressure from the conduit 50, emanating either to or from the valve 47, emergency tank 64 and conduit 67 will flow into the atmosphere through the space between the pin element 24 and the interior wall of the housing 48. Also the air pressure from the tractor at conduit 46 will be released to atmosphere.

It is thus seen that if the pin 24, which may involve one or more pins, is not properly inserted to lock the bogie to the trailer that the bogie mechanical parking brakes will continue to be applied to prevent it from rolling. An operator therefore will have to take the time to properly insert the pin element 24 into the openings of the rail of the bogie and track of the trailer before he can operate the trailer over the road.

The bleeding of the air caused by the pins not being in locked positions prevents air pressure from being applied to the brakes. Also, the pressure which may already be present in the braking chambers will be released to atmosphere when the pins are not connected.

An important feature of the present invention is that the actual position of the pin itself controls the interlock system. It is not dependent upon electronic or other means to detect the position of the pin.

What is claimed is:

1. In combination with a tractor driven trailer having a pair of tracks with spaced apertures secured thereto, a structure having a plurality of wheels for supporting said trailer and having a pair of rail elements for slidable mounting to the tracks of said trailer, said structure including parking brake means to inhibit rotation of the wheels on said structure and parking brake chambers for receiving air pressure from a source of air pressure to selectively overcome the braking of said parking brake means;

a locking mechanism comprising:

(a) guide means having an opening therein secured to said structure for receiving a pin element;
(b) a pin element secured to said structure and disposed to move within the opening of said guide means;
(c) means for moving said pin within the opening of said guide means from at least one of said rails into a selected one of said plurality of apertures in one of said tracks to secure said structure to said trailer;
(d) means for connecting air pressure from said source into the opening within said guide means;
(e) means for connecting said opening within said guide means to said brake chambers;
(f) means associated with said pin element including a pair of spaced flexible ring elements extending around said pin and dimensioned to compress when inserted into the opening in said guide means to provide a sealed chamber between said ring elements with said guide means within said opening;
(g) said sealed chamber being alignable with said means for connecting air pressure and means for connecting said opening when said pin is inserted from one of said rails through said selected one aperture of one of said tracks to permit air pressure to pass from said source through said sealed chamber into said brake chambers, with no air pressure being applied from said source to said brake chambers when said pin is not inserted from said one rail through said selected one aperture in said one of said tracks and said sealed chamber is misaligned with respect to the means for connecting said air pressure and said means for connecting said opening.

2. A combination as set forth in claim 1 wherein a pair of grooves are provided in said pin element to receive said pair of flexible ring elements.

3. A combination as set forth in claim 2 wherein said means for connecting air pressure from said source into said opening and said means for connecting the opening to said brake chambers are in alignment with respect to each other.

4. A combination as set forth in claim 3 wherein the space between said pair of flexible rings is aligned with said means for connecting air pressure and said means for connecting the opening when said pin elements extends from at least one of said rails into said selected one aperture in one of said tracks, with said space between said pair of flexible rings being misaligned with said means for connecting air pressure and said means for connecting the opening when said pin element is not extended from said at least one of said rails into said selected one aperture in one of said tracks.

5. A combination as set forth in claim 4 wherein a pair of pin elements are disposed to extend fom said pair of rails into selected apertures in said pair of tracks.

6. A combination as set forth in claim 4 wherein air is exhausted to atmosphere from said means for connecting air pressure and said means for connecting the opening within said guide means when said pin is not extended from said one rail into said selected one aperture in said track.

7. A combination as set forth in claim 5 wherein said means for connecting the opening with said guide member to said brake chambers includes an air pressure tank and valve for transmitting air pressure to said air chambers when the pressure in said tank reaches a predetermined level.

8. A combination as set forth in claim 7 wherein pressurized air in said air chambers overcomes mechanical spring pressure to release the parking brakes on wheels of said bogie to permit said trailer to be operated.

9. A combination as set forth in claim 8 wherein a mechanical linkage including a plurality of lever arms is used to extend or retract said pair of pin elements and a mechanical spring is connected to said mechanical linkage to normally urge said pair of pin elements to extended positions.

* * * * *